United States Patent
Li et al.

(10) Patent No.: US 9,305,512 B2
(45) Date of Patent: Apr. 5, 2016

(54) ARRAY SUBSTRATE, DISPLAY DEVICE AND METHOD FOR CONTROLLING REFRESH RATE

(71) Applicants: BOE Technology Group Co., Ltd., Beijing (CN); Chengdu BOE Optoelectronics Technology Co., Ltd., Chengdu (CN)

(72) Inventors: Fan Li, Beijing (CN); Hongwei Li, Beijing (CN); Tianma Li, Beijing (CN); Xiaomei Huang, Beijing (CN); Youqiang Lu, Beijing (CN); Jing Wang, Beijing (CN); Yun Qiu, Beijing (CN)

(73) Assignees: BOE Technology Group Co., Ltd, Beijing (CN); Chengdu BOE Optoelectronics Technology Co., Ltd, Chengdu (CN)

( * ) Notice: Subject to any disclaimer, the term of this patent is extended or adjusted under 35 U.S.C. 154(b) by 203 days.

(21) Appl. No.: 14/075,287

(22) Filed: Nov. 8, 2013

(65) Prior Publication Data

US 2014/0125906 A1     May 8, 2014

(30) Foreign Application Priority Data

Nov. 8, 2012 (CN) .......................... 2012 1 0444197

(51) Int. Cl.
  G09G 5/00     (2006.01)
  G09G 3/36     (2006.01)
  G02F 1/133    (2006.01)

(52) U.S. Cl.
  CPC .......... *G09G 3/3696* (2013.01); *G02F 1/13306* (2013.01); *G09G 3/3648* (2013.01); G09G2300/0876 (2013.01); G09G 2320/103 (2013.01); G09G 2330/021 (2013.01); G09G 2340/0435 (2013.01)

(58) Field of Classification Search
  CPC .................... G09G 2300/0842; G09G 3/3233; G09G 3/3648; G09G 2300/0426; G09G 2300/0809

USPC ......................................................... 345/205
See application file for complete search history.

(56) References Cited

U.S. PATENT DOCUMENTS 6,577,362 B1   6/2003  Moore
2002/0154253 A1  10/2002  Cairns et al.
(Continued)

FOREIGN PATENT DOCUMENTS

CN   1372242 A   10/2002
CN   1822076 A   8/2006
(Continued)

OTHER PUBLICATIONS

Second Office Action from Chinese Patent Office for priority application 201210444197.9 dated Feb. 6, 2015 with English translation.
(Continued)

*Primary Examiner* — Lixi C Simpson
*Assistant Examiner* — Ngan T Pham Lu
(74) *Attorney, Agent, or Firm* — Frommer Lawrence & Haug LLP

(57) ABSTRACT

The present invention discloses array substrate, display device and method for controlling refresh rate of an array substrate. The array substrate includes; a plurality of pixel structures each including gate line, data line, common electrode line, first switching element at intersection of the gate line and the data line, pixel electrode, second switching element, and first transparent electrode. Gate, source and drain of the first switching element are connected to the gate line, the date line and the pixel electrode, respectively. Gate, source and drain of the second switching element are connected to second switching controlling line, common electrode signal terminal and the first transparent electrode, respectively. A first storage capacitance is formed between the pixel electrode and the common electrode line and/or between the pixel electrode and the gate line, and a second storage capacitance is formed between the pixel electrode and the first transparent electrode.

9 Claims, 3 Drawing Sheets

(56) References Cited

U.S. PATENT DOCUMENTS

2012/0113080 A1* 5/2012 den Boer .................. 345/211
2012/0212521 A1 8/2012 Yamauchi et al.

FOREIGN PATENT DOCUMENTS

JP  2007-272243 A  10/2007
WO  WO 00/55681 A  9/2000

OTHER PUBLICATIONS

First Office Action from Chinese Patent Office for priority application 201210444197.9 dated Sep. 2, 2014 with English translation.
European search report issued by European Patent Office for corresponding application 13192087 dated Jan. 16, 2014.

* cited by examiner

ARRAY SUBSTRATE, DISPLAY DEVICE AND METHOD FOR CONTROLLING REFRESH RATE

FIELD OF THE INVENTION

The present invention relates to the field of display technologies, and particularly, to an array substrate, a display device and a method for controlling refresh rate of the array substrate.

BACKGROUND OF THE INVENTION

Refresh rate of a liquid crystal display (LCD) is usually 60 Hz, and display time for each frame is about 1/60=16.67 ms. If there are M rows of gate lines, switching time assigned to liquid crystal driven by each row of gate line is (16.67/M) ms. Currently, response time of a LCD is about 4 ms, and liquid crystal has no time to respond during active period of a gate driving pulse signal. Therefore, there is a storage capacitor Cs (with capacitance of about 0.5 pF) on each pixel liquid crystal of a LCD, as such, power is supplied to the pixel liquid crystal via the storage capacitor Cs after the gate driving pulse signal vanishes, and is maintained until gate driving pulse signal of the next frame arrives.

If refresh rate of the LCD is reduced, the storage capacitor Cs cannot continuously supply power to the pixel liquid crystal due to its insufficient capacitance before the gate driving pulse signal of the next frame arrives. It is thus clear that capacitance of the storage capacitor Cs limits the reduction in refresh rate of LCD, which causes the LCD to always work under a high refresh rate, such as 60 Hz or above, during its operation.

However, when a displayed picture of LCD is a still picture, a high display refresh rate is not required. Thus, according to the current solution, the LCD always works under a high refresh rate during its operation, which results in unnecessary power consumption.

SUMMARY OF THE INVENTION

An objective of the present invention is to provide an array substrate, a display device including the array substrate and a method for controlling refresh rate of the array substrate, to solve the problem of insufficient capacitance of storage capacitor when a display works under a low refresh rate.

To achieve the above objective, the present invention provides an array substrate, including a plurality of pixel structures, and each pixel structure includes: a gate line, a data line, a common electrode line, a first switching element at intersection of the gate line and the data line, and a pixel electrode. Gate of the first switching element is connected to the gate line, source of the first switching element is connected to the date line, drain of the first switching element is connected to the pixel electrode, and a first storage capacitance is formed between the pixel electrode and the common electrode line and/or between the pixel electrode and the gate line. The pixel structure further includes a second switching element and a first transparent electrode. Gate of the second switching element is connected to a second switching controlling line for controlling conduction or disconnection of the second switching element, source of the second switching element is connected to a common electrode signal terminal, drain of the second switching element is connected to the first transparent electrode, and when the second switching element is conducted, a second storage capacitance is formed between the pixel electrode and the first transparent electrode.

Preferably, when the array substrate works under a first refresh rate, the second switching controlling line may output a cut-off voltage, the second switching element is disconnected, and the second storage capacitance is not formed between the pixel electrode and the first transparent electrode. When the array substrate works under a second refresh rate, the second switching controlling line may output a turn-on voltage, the second switching element is conducted, and the second storage capacitance is formed between the pixel electrode and the first transparent electrode. The first refresh rate is M times the second refresh rate, wherein M is larger than 1.

Preferably, total capacitance of liquid crystal capacitance of liquid crystal driven by the pixel electrode, the first storage capacitance and the second storage capacitance is M times the total capacitance of the liquid crystal capacitance and the first storage capacitance.

Preferably, the pixel structure may further include a third switching element and a second transparent electrode. Gate of the third switching element is connected to a third switching controlling line for controlling conduction or disconnection of the third switching element, source of the third switching element is connected to the common electrode signal terminal, drain of the third switching element is connected to the second transparent electrode, and when the third switching element is conducted, a third storage capacitance is formed between the pixel electrode and the second transparent electrode.

Preferably, when the array substrate works under a first refresh rate, both the second switching controlling line and the third switching controlling line may output a cut-off voltage, both the second switching element and the third switching element are disconnected, the second storage capacitance is not formed between the pixel electrode and the first transparent electrode, and the third storage capacitance is not formed between the pixel electrode and the second transparent electrode. When the array substrate works under a second refresh rate, the second switching controlling line may output a turn-on voltage, the second switching element is conducted, and the second storage capacitance is formed between the pixel electrode and the first transparent electrode; the third switching controlling line may output a cut-off voltage, the third switching element is disconnected, and the third storage capacitance is not formed between the pixel electrode and the second transparent electrode. When the array substrate works under a third refresh rate, the second switching controlling line may output a cut-off voltage, the second switching element is disconnected, and the second storage capacitance is not formed between the pixel electrode and the first transparent electrode; the third switching controlling line may output a turn-on voltage, the third switching element is conducted, and the third storage capacitance is formed between the pixel electrode and the second transparent electrode. The first refresh rate is M times the second refresh rate, wherein M is larger than 1, and the first refresh rate is P times the third refresh rate, wherein P is larger than 1 and not equal to M. In this condition, total capacitance of liquid crystal capacitance of liquid crystal driven by the pixel electrode, the first storage capacitance and the second storage capacitance is M times the total capacitance of the liquid crystal capacitance and the first storage capacitance. Total capacitance of the liquid crystal capacitance, the first storage capacitance and the third storage capacitance is P times the total capacitance of the liquid crystal capacitance and the first storage capacitance.

Alternatively, when the array substrate works under a third refresh rate, both the second switching controlling line and the third switching controlling line may output a turn-on voltage, both the second switching element and the third switching element are conducted, the second storage capacitance is formed between the pixel electrode and the first transparent electrode, and the third storage capacitance is formed between the pixel electrode and the second transparent electrode. In this condition, total capacitance of the liquid crystal capacitance, the first storage capacitance, the second storage capacitance and the third storage capacitance is P times the total capacitance of the liquid crystal capacitance and the first storage capacitance, and P is larger than M.

The present invention also provides a display device, including the array substrate according to the present invention and a control module. The control module is used for switching refresh rate of the array substrate, and when the array substrate works under a first refresh rate, a cut-off voltage is output to the second switching element through the second switching controlling line to disconnect the second switching element; when the array substrate works under a second refresh rate, a turn-on voltage is output to the second switching element through the second switching controlling line to conduct the second switching element. The first refresh rate is M times the second refresh rate, and M is larger than 1.

Preferably, each pixel structure of the array substrate may further include a third switching element and a second transparent electrode. Gate of the third switching element is connected to a third switching controlling line for controlling conduction or disconnection of the third switching element, source of the third switching element is connected to the common electrode signal terminal; drain of the third switching element is connected to the second transparent electrode, and when the third switching element is conducted, a third storage capacitance is formed between the pixel electrode and the second transparent electrode. When the array substrate works under a first refresh rate, a cut-off voltage is output to the second switching element and the third switching element through the second switching controlling line and the third switching controlling line, respectively, to disconnect the second switching element and the third switching element; when the array substrate works under a second refresh rate, a turn-on voltage is output to the second switching element through the second switching controlling line to conduct the second switching element and a cut-off voltage is output to the third switching element through the third switching controlling line to disconnect the third switching element. When the array substrate works under a third refresh rate, a cut-off voltage is output to the second switching element through the second switching controlling line to disconnect the second switching element and a turn-on voltage is output to the third switching element through the third switching controlling line to conduct the third switching element. The first refresh rate is M times the second refresh rate, wherein M is larger than 1, and the first refresh rate is P times the third refresh rate, wherein P is larger than 1 and not equal to M.

Alternatively, when the array substrate works under a third refresh rate, a turn-on voltage is output to the second switching element and the third switching element through the second switching controlling line and the third switching controlling line, respectively, to conduct the second switching element and the third switching element. In this condition, P is larger than M.

Preferably, the control module may be configured to switch refresh rate of the array substrate according to preset conditions.

The present invention also provides a method for controlling refresh rate of the array substrate according to the present invention, and the control method includes: switching refresh rate of the array substrate; when the array substrate works under a first refresh rate, outputting a cut-off voltage to the second switching element through the second switching controlling line to disconnect the second switching element; and when the array substrate works under a second refresh rate, outputting a turn-on voltage to the second switching element through the second switching controlling line to conduct the second switching element. The first refresh rate is M times the second refresh rate, and M is larger than 1

Preferably, each pixel structure of the array substrate may further include a third switching element and a second transparent electrode. Gate of the third switching element is connected to a third switching controlling line for controlling conduction or disconnection of the third switching element, source of the third switching element is connected to the common electrode signal terminal, drain of the third switching element is connected to the second transparent electrode, and when the third switching element is conducted, a third storage capacitance is formed between the pixel electrode and the second transparent electrode. The control method may include: when the array substrate works under a first refresh rate, outputting a cut-off voltage to the second switching element and the third switching element through the second switching controlling line and the third switching controlling line, respectively, to disconnect the second switching element and the third switching element; when the array substrate works under a second refresh rate, outputting a turn-on voltage to the second switching element through the second switching controlling line to conduct the second switching element, and outputting a cut-off voltage to the third switching element through the third switching controlling line to disconnect the third switching element; when the array substrate works under a third refresh rate, outputting a cut-off voltage to the second switching element through the second switching controlling line to disconnect the second switching element, and outputting a turn-on voltage to the third switching element through the third switching controlling line to conduct the third switching element. The first refresh rate is M times the second refresh rate, wherein M is larger than 1, and the first refresh rate is P times the third refresh rate, wherein P is larger than 1 and not equal to M.

Alternatively, when the array substrate works under a third refresh rate, outputting a turn-on voltage to the second switching element and the third switching element through the second switching controlling line and the third switching controlling line, respectively, to conduct the second switching element and the third switching element. In this condition. P is larger than M.

Preferably, the control method may further include switching refresh rate of the array substrate according to preset conditions.

According to the technical solutions provided by the present invention, the second storage capacitance (and/or the third storage capacitance) can be formed between the pixel electrode and the first transparent electrode (and/or the second transparent electrode). When the array substrate works under a high refresh rate as required, the second switching element (and the third switching element) is disconnected, and accordingly the second storage capacitance (and the third storage capacitance) is not formed between the pixel electrode and the first transparent electrode (and the second transparent electrode). When the array substrate works under a low refresh rate as required, the second switching element (and/or the third switching element) is conducted, accordingly the second storage capacitance (and/or the third storage capacitance) is formed between the pixel electrode and the first transparent electrode (and/or the second transparent electrode), so as to increase total capacitance, and power supply to liquid crystal under the low refresh rate is thus supported.

DETAILED DESCRIPTION OF EMBODIMENTS

Figure 1:
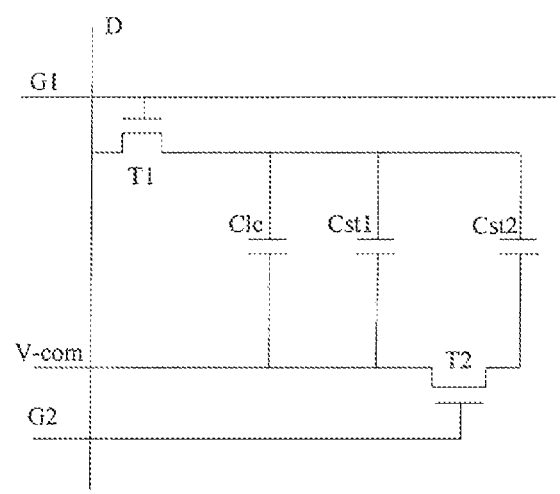
FIG. 1 is a schematic diagram of an equivalent circuit of one pixel structure of the array substrate according to an embodiment of the present invention.

Taking liquid crystal display device as an example, an embodiment of the present invention provides an array substrate, and FIG. 1 is a schematic diagram of an equivalent circuit of one pixel structure of the array substrate according to the embodiment of the present invention. The pixel structure includes gate line G1, data line D, common electrode line V-com, a first switching element T1 at intersection of the gate line G1 and the data line D, a pixel electrode (not shown in FIG. 1), a second switching element T2 and a first transparent electrode (not shown in FIG. 1).

Gate of the first switching element T1 is connected to the gate line G1, source of the first switching element T1 is connected to the data line D, and drain of the first switching element T1 is connected to the pixel electrode. A first storage capacitance Cst1 is formed between the pixel electrode and the common electrode line V-com and/or between the pixel electrode and the gate line G1. As the drain of the first switching element T1 is connected to the pixel electrode, in the equivalent circuit shown in FIG. 1, the first storage capacitance Cst1 is equivalent to as capacitor with one end connected to the drain of the first switching element T1 and the other end connected to the common electrode line V-com.

Gate of the second switching element T2 is connected to a second switching controlling line G2 for controlling conduction or disconnection of the second switching element T2, source of the second switching element T2 is connected to the common electrode signal terminal (connected to the common electrode V-com in the equivalent circuit of FIG. 1), and drain of the second switching element T2 is connected to the first transparent electrode.

The common electrode signal terminal may be disposed on the array substrate, or may be disposed on a color filter substrate, as long as common electrode signals are input through the common electrode signal terminal, which is not limited in the present invention.

A second storage capacitance Cst2 is formed between the pixel electrode and the first transparent electrode. As the pixel electrode is connected to the drain of the first switching element T1 and the first transparent electrode is connected to the drain of the second switching element T2, in the equivalent circuit shown in FIG. 1, the second storage capacitance Cst2 is equivalent to a capacitor with one end connected to the drain of the first switching element T1 and the other end connected to the common electrode line V-com via the second switching element T2. It should be noted that, the equivalent circuit shown in FIG. 1 is an equivalent circuit taking that the first transparent electrode is connected to the common electrode line V-com of the array substrate via the second switching element T2 as an example. If the first transparent electrode is connected to the common electrode line of the color filter electrode via the second switching element T2, the second storage capacitance Cst2 is equivalent to a capacitor with one end connected to the drain of the first switching element T1 and the other end connected to the common electrode line of the color filter substrate via the second switching element T2.

The pixel electrode is used for driving corresponding liquid crystal. A plate capacitance is formed between the array substrate and the color filter substrate of a LCD device by the liquid crystal. Therefore, in the equivalent circuit shown in FIG. 1, the plate capacitance formed by the liquid crystal driven by the pixel electrode (hereinafter, referred to as liquid crystal capacitance Clc) is equivalent to a capacitor with one end connected to the drain of the first switching element T1 and the other end connected to the common electrode line V-com.

According to the embodiment of the present invention, the switching element may be a thin film transistor (TFT), but not limited thereto.

It should be noted that, FIG. 1 is a schematic diagram of an equivalent circuit of one pixel structure of the array substrate according to an embodiment of the present invention. The array substrate according to the embodiment of the present invention includes a plurality of gate lines, a plurality of data lines, a plurality of common electrode lines, a plurality of first switching elements at respective intersections of gate lines and data lines, a plurality of pixel electrodes, a plurality of second switching elements and a plurality of first transparent electrode.

It should also be noted that, embodiments of the present invention are described by taking an array substrate in a LCD device as an example. The person skilled in the art should understand that the array substrate according to the present invention not only applies to a LCD device, but also applies to other display devices to which power is supplied via storage capacitance, such as a digital photo frame, a cell phone and the like.

In the array substrate according to the present invention, equivalent capacitance supplying power to liquid crystal should ensure that power can be continuously supplied to the liquid crystal between gate driving pulse signals of two frames. Therefore, to enable the array substrate to work under a low refresh rate, the transparent electrode is provided on the array substrate according to the present invention, such that the second storage capacitance can be formed between the transparent electrode and the pixel electrode to increase the total capacitance supplying power to the liquid crystal, and thus ensuring that power is continuously supplied to the liquid crystal between gate driving pulse signals of two frames. Therefore, the array substrate according to the present invention can work under a low refresh rate to reduce power consumption.

Figure 2:
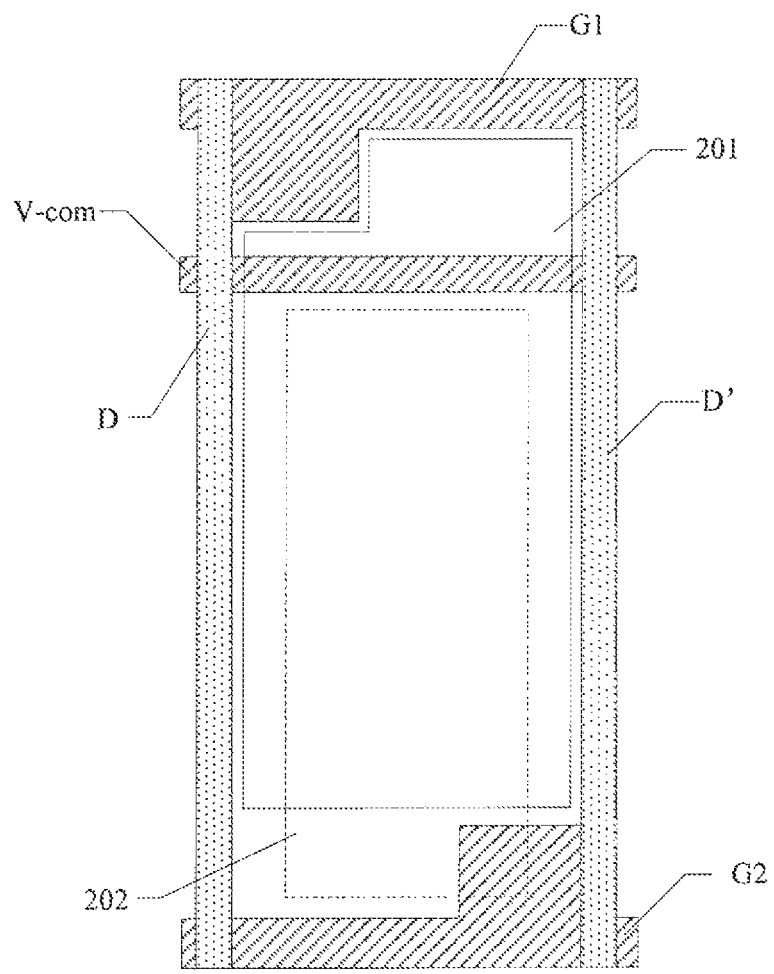
FIG. 2 is a schematic diagram of a planar structure of one pixel structure of the array substrate according to an embodiment of the present invention.

FIG. 2 is a schematic diagram of a planar structure of one pixel structure of the array substrate according to an embodiment of the present invention. Referring to FIG. 2, an array substrate in a twisted nematic (TN) mode LCD panel is illustrated. In FIG. 2, the gate line G1, the common electrode line V-com and gate of the second switching element are fabricated in a gate metal layer, and the gate of the second switching element is connected to the second switching controlling line G2 for controlling conduction or disconnection of the second switching element. The data line D and signal line D' connecting to the source of the second switching element are fabricated in a source drain (SD) metal layer. The first storage capacitance is formed between the pixel electrode 201 shown in the solid box and the common electrode line V-com, and the second storage capacitance is formed between the first transparent electrode 202 shown in the dashed box and the pixel electrode 201. Common electrode is provided on the color filter substrate, which is not elaborated.

According to this embodiment, the source of the second switching element can be connected to the common electrode signal terminal through the signal line D'. To connect the signal line D' to the common electrode line V-com, a via is required to be formed in an area where the signal line D' and the common electrode line V-com overlap, and conductive material is deposited.

It should be noted that, FIG. 2 is only an example of the array substrate according to the present invention, and is not used to limit the array substrate according to the present invention.

The array substrate according to the present invention also applies to Advanced super Dimension Switch techniques, and hereinafter is referred to as array substrate in a ADS mode LCD panel. All oriented liquid crystal molecules between slit electrodes and right above the electrodes in a liquid crystal cell can be rotated through multiple dimension electric field, thus improving working efficiency of liquid crystal and increasing light transmission efficiency, and the multiple dimension electric field is formed by electric field generated by edges of the slit electrodes in a same plane and electric field generated between a slit electrode layer and a plate electrode layer. ADS techniques can improve picture quality of a TFT-LCD product, and have advantages of high resolution, high transmission, low power consumption, wide viewing angle, high aperture ratio, low chromatic aberration, no push Mura and the like. For different applications, improvements on ADS techniques include high transmission I-ADS technique, high aperture ratio H-ADS technique, high resolution S-ADS technique, and the like. The person skilled in the art should understand that the pixel electrode can be plate shaped while the common electrode is slit shaped, or, the pixel electrode can be slit shaped while the common electrode is plate shaped. In addition, the arrangement order of the pixel electrode and the common electrode can be reversed, but the upper electrode is slit shaped while the lower electrode is plate shaped.

When the array substrate works under a certain refresh rate, equivalent capacitance (i.e., the liquid crystal capacitance and the storage capacitance) supplying power to the liquid crystal should satisfy the followings: the equivalent capacitance can be fully charged while the switching element is conducted, and the equivalent capacitance can continuously supply power to the liquid crystal to drive the liquid crystal to deflect during a period between two gate driving pulse signals.

The array substrate according to the present invention can work under a first refresh rate and a second refresh rate, the first refresh rate is M times the second refresh rate (M>1, the first refresh rate is higher than the second refresh rate). Taking the equivalent circuit shown in FIG. 1 as an example, when the array substrate works under the first refresh rate, the second switching element T2 can be disconnected, such that the second storage capacitance Cst2 is not formed between the pixel electrode and the first transparent electrode, and therefore, the equivalent capacitance supplying power to liquid crystal only includes the liquid crystal capacitance Clc and the first storage capacitance Cst1, but excludes the second storage capacitance Cst2. When the array substrate works under the second refresh rate, the second switching element T2 can be conducted, such that the second storage capacitance Cst2 is formed between the pixel electrode and the first transparent electrode, and therefore, the equivalent capacitance supplying power to the liquid crystal includes the liquid crystal capacitance Clc, the first storage capacitance Cst1 and the second storage capacitance Cst2. Accordingly, when the array substrate works under the first refresh rate, the second switching controlling line G2 outputs a cut-off voltage, and the second switching element T2 is disconnected, such that the second storage capacitance Cst2 is not formed between the pixel electrode and the first transparent electrode; when the array substrate works under the second refresh rate, the second switching controlling line G2 outputs a turn-on voltage, and the second switching element T2 is conducted, such that the second storage capacitance Cst2 is formed between the pixel electrode and the first transparent electrode.

When the array substrate works under the first refresh rate, a cut-off voltage is output to the second switching element T2 through the second switching controlling line G2, and the second storage capacitance Cst2 is thus not formed. The equivalent capacitance between the first switching element T1 and the common electrode line V-com is the sum of the liquid crystal capacitance Clc and the first storage capacitance Cst1. When the array substrate works under the second refresh rate, a turn-on voltage is output to the second switching element T2 through the second switching controlling line G2, and the second storage capacitance Cst2 is thus formed. The equivalent capacitance between the first switching element T1 and the common electrode line V-com is the sum of the liquid crystal capacitance Clc, the first storage capacitance Cst1, and second storage capacitance Cst2.

Accordingly, when the first refresh rate is M times the second refresh rate, the equivalent capacitance supplying power to the liquid crystal under the second refresh rate should be M times that under the first refresh rate. That is, the sum of the liquid crystal capacitance Clc, the first storage capacitance Cst1, and second storage capacitance Cst2 is M times that of the liquid crystal capacitance Clc and the first storage capacitance Cst1.

According to another embodiment of the present invention, the array substrate can also support switching among more than two (for example, three) refresh rates.

The array substrate according to the present invention can work under a third refresh rate, the first refresh rate is M times the second refresh rate (M>1, that is, the first refresh rate is higher than the second refresh rate), and the first refresh rate is P times the third refresh rate (P>1 and not equal to M, that is, the first refresh rate is higher than the third refresh rate, and the third refresh rate is different from the second refresh rate).

The array substrate according to the present invention may further include a third switching element whose conduction or disconnection is controlled by a third switching controlling line and a second transparent electrode. Gate of the third switching element is connected to the third switching controlling line, source of the third switching element is connected to the common electrode signal terminal, and drain of the third switching element is connected to the second transparent electrode. When the third switching element is conducted, a third storage capacitance is formed between the second transparent electrode and the pixel electrode.

When the array substrate works under a first refresh rate, both the second switching element and the third switching element are disconnected; when the array substrate works under a second refresh rate, the second switching element is conducted, and the third switching element is disconnected; when the array substrate works under a third refresh rate, the third switching element is conducted, and the second switching element is disconnected (or conducted). Under the first refresh rate, equivalent capacitance supplying power to the liquid crystal is the sum of the liquid crystal capacitance and the first storage capacitance; under the second refresh rate, the equivalent capacitance supplying power to the liquid crystal is the sum of the liquid crystal capacitance, the first storage capacitance and the second storage capacitance, and the sum of the liquid crystal capacitance, the first storage capacitance and the second storage capacitance is M times the sum of the liquid crystal capacitance and the first storage capacitance; under the third refresh rate, the equivalent capacitance supplying power to the liquid crystal is the sum of the liquid crystal capacitance, the first storage capacitance and the third storage capacitance for the sum of the liquid crystal capacitance, the first storage capacitance, the second storage capacitance and the third storage capacitance), and the sum of the liquid crystal capacitance, the first storage capacitance and the third storage capacitance is P times the sum of the liquid crystal capacitance and the first storage capacitance (or the sum of the liquid crystal capacitance, the first storage capacitance, the second storage capacitance and the third storage capacitance is P times the sum of the liquid crystal capacitance and the first storage capacitance).

For the above case where the second switching element and the third switching element are conducted under the third refresh rate, equivalent capacitance supplying power to the liquid crystal is the sum of the liquid crystal capacitance, the first storage capacitance, the second storage capacitance and the third storage capacitance, the equivalent capacitance is larger than the equivalent capacitance supplying power to the liquid crystal under the second refresh rate (that is, the sum of the liquid crystal capacitance, the first storage capacitance and the second storage capacitance). It is thus clear that, the period between two gate driving pulse signals under the second refresh rate is shorter than that between two gate driving pulse signals under the third refresh rate, that is, the second refresh rate is higher than the third refresh rate, and in other words, P>M.

In addition, the array substrate according to the present invention can further switch among more than three refresh rates, an array substrate which can switch among more refresh rates can be achieved by the person skilled in the art based on the teaching of the present invention, and the present invention intends to cover all these implementations.

Figure 3:
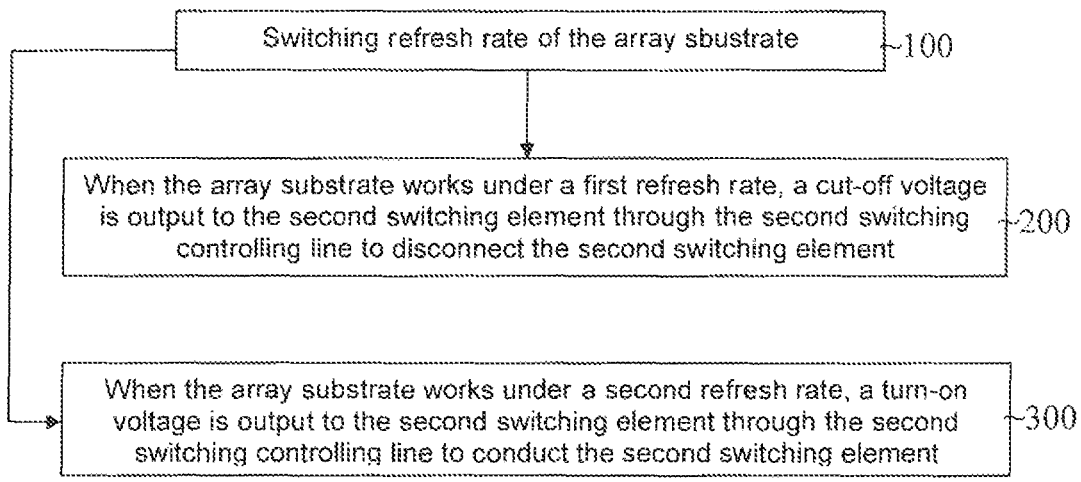
FIG. 3 is a flow chart of as control method according to an embodiment of the present invention.

The present invention also provides a method for controlling refresh rate of an array substrate. FIG. 3 is a flowchart of a control method according to an embodiment of the present invention. The method includes:

Step 100, switching refresh rate of the array substrate;

Step 200, when the array substrate works under a first refresh rate, a cut-off voltage is output to the second switching element through the second switching controlling line to disconnect the second switching element;

Step 300, when the array substrate works under a second refresh rate, a turn-on voltage is output to the second switching element through the second switching controlling line to conduct the second switching element.

The person skilled in the art can achieve a control method for switching the array substrate among more refresh rates based on the teaching of the present invention. For example, under the first refresh rate, both the second switching element and the third switching element are disconnected; under the second refresh rate, the second switching element is conducted and the third switching element is disconnected; under the third refresh rate, the second switching element is disconnected (or conducted), and the third refresh rate is conducted.

in addition, the step 100 may further include: switching refresh rate of the array substrate according to preset conditions.

The preset conditions can include (but is not limited to): when a moving picture is detected, the refresh rate of the array substrate can be switched to the first refresh rate; when a still picture is detected, the refresh rate of the array substrate can be switched to the second refresh rate. Additionally or alternatively, when no external triggering signal is detected within a predetermined period, the refresh rate of the array substrate can be switched to the second refresh rate. In addition, corresponding switching condition can be set according to practical scenarios.

When the array substrate is switched to a new refresh rate, conduction or disconnection of each switching element is accordingly controlled according to the switched refresh rate.

Figure 4:
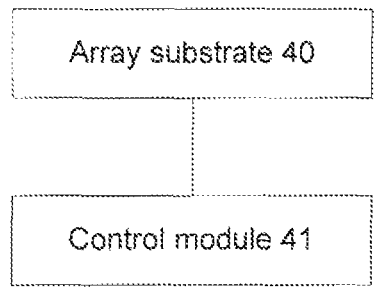
FIG. 4 is a structural schematic diagram of a display device according to an embodiment of the present invention.

The present invention also provides a display device including the array substrate according to the present invention. The display device may be (but is not limited to) a liquid crystal panel, a liquid crystal television, a liquid crystal display, digital photo frame, cell phone, or the like, FIG. 4 is a structural schematic diagram of a display device according to the present invention. The display device includes the array substrate 40 and a control module 41.

The control module 41 is used for switching refresh rate of the array substrate 40. When the array substrate works under a first refresh rate, a cut-off voltage is output to the second switching element through the second switching controlling line to disconnect the second switching element. When the array substrate works under a second refresh rate, a turn-on voltage is output to the second switching element through the second switching controlling line to conduct the second switching element.

The control module 41 can switch refresh rate of the array substrate 40 according to preset conditions. The preset conditions include (but are not limited to) various conditions described above.

Obviously, various modifications and variations cart be made by the person skilled in the art without departing from the spirit and scope of the present invention. As such, if these modifications and variations are within the scope of the claims and its equivalent techniques of the present invention, the present invention intends to include all these modifications and variations.

The invention claimed is:

1. An array substrate, including a plurality of pixel structures, each pixel structure including: a gate line, a data line, a common electrode line, a first switching element at intersection of the gate line and the data line, and a pixel electrode,
    wherein, gate of the first switching element is connected to the gate line, source of the first switching element is connected to the date line, drain of the first switching element is connected to the pixel electrode, and a first storage capacitance is formed between the pixel electrode and the common electrode line and/or between the pixel electrode and the gate line,
    the pixel structure further includes:
    a second switching element; and
    a first transparent electrode,
    wherein, gate of the second switching element is connected to a second switching controlling line for controlling conduction or disconnection of the second switching element, source of the second switching element is connected to a common electrode signal terminal, drain of the second switching element is connected to the first transparent electrode, and when the second switching element is conducted, a second storage capacitance is formed between the pixel electrode and the first transparent electrode,
    wherein, the pixel structure further includes:
    a third switching element; and
    a second transparent electrode,
    wherein, gate of the third switching element is connected to a third switching controlling line for controlling conduction or disconnection of the third switching element, source of the third switching element is connected to the common electrode signal terminal, drain of the third switching element is connected to the second transparent electrode, and when the third switching element is conducted, a third storage capacitance is formed between the pixel electrode and the second transparent electrode.

2. The array substrate according to claim 1, wherein,
when the array substrate works under a first refresh rate, both the second switching controlling line and the third switching controlling line output a cut-off voltage, both the second switching element and the third switching element are disconnected, the second storage capacitance is not formed between the pixel electrode and the first transparent electrode, and the third storage capacitance is not formed between the pixel electrode and the second transparent electrode;
when the array substrate works under a second refresh rate, the second switching controlling line outputs a turn-on voltage, the second switching element is conducted, and the second storage capacitance is formed between the pixel electrode and the first transparent electrode; the third switching controlling line outputs a cut-off voltage, the third switching element is disconnected, and the third storage capacitance is not formed between the pixel electrode and the second transparent electrode;
when the array substrate works under a third refresh rate, the second switching controlling line outputs a cut-off voltage, the second switching element is disconnected, and the second storage capacitance is not formed between the pixel electrode and the first transparent electrode; the third switching controlling line outputs a turn-on voltage, the third switching element is conducted, and the third storage capacitance is formed between the pixel electrode and the second transparent electrode;
wherein, the first refresh rate is M times the second refresh rate, M is larger than 1, and the first refresh rate is P times the third refresh rate, P is larger than 1 and not equal to M.

3. The array substrate according to claim 2, wherein,
total capacitance of liquid crystal capacitance of liquid crystal driven by the pixel electrode, the first storage capacitance and the second storage capacitance is M times the total capacitance of the liquid crystal capacitance and the first storage capacitance,
total capacitance of the liquid crystal capacitance, the first storage capacitance and the third storage capacitance is P times the total capacitance of the liquid crystal capacitance and the first storage capacitance.

4. The array substrate according to claim 1, wherein,
when the array substrate works under a first refresh rate, both the second switching controlling line and the third switching controlling line output a cut-off voltage, both the second switching element and the third switching element are disconnected, the second storage capacitance is not formed between the pixel electrode and the first transparent electrode, and the third storage capacitance is not formed between the pixel electrode and the second transparent electrode;
when the array substrate works under a second refresh rate, the second switching controlling line outputs a turn-on voltage, the second switching element is conducted, and the second storage capacitance is formed between the pixel electrode and the first transparent electrode; the third switching controlling line outputs a cut-off voltage, the third switching element is disconnected, and the third storage capacitance is not formed between the pixel electrode and the second transparent electrode;
when the array substrate works under a third refresh rate, both the second switching controlling line and the third switching controlling line output a turn-on voltage, both the second switching element and the third switching element are conducted, the second storage capacitance is formed between the pixel electrode and the first transparent electrode, and the third storage capacitance is formed between the pixel electrode and the second transparent electrode;
wherein, the first refresh rate is M times the second refresh rate, M is larger than 1, and the first refresh rate is P times the third refresh rate, P is larger than M.

5. The array substrate according to claim 4, wherein,
total capacitance of liquid crystal capacitance of liquid crystal driven by the pixel electrode, the first storage capacitance and the second storage capacitance is M times the total capacitance of the liquid crystal capacitance and the first storage capacitance,
total capacitance of the liquid crystal capacitance, the first storage capacitance, the second capacitance and the third storage capacitance is P times the total capacitance of the liquid crystal capacitance and the first storage capacitance.

6. A display device including:
the array substrate according to claim 1; and
a control module for switching refresh rate of the array substrate, and when the array substrate works under a first refresh rate, a cut-off voltage is output to the second switching element and the third switching element through the second switching controlling line and the third switching controlling line, respectively, to disconnect the second switching element and the third switching element; when the array substrate works under a second refresh rate, a turn-on voltage is output to the second switching element through the second switching controlling line to conduct the second switching element and a cut-off voltage is output to the third switching element through the third switching controlling line to disconnect the third switching element; when the array substrate works under a third refresh rate, a cut-off voltage is output to the second switching element through the second switching controlling line to disconnect the second switching element and a turn-on voltage is output to the third switching element through the third switching controlling line to conduct the third switching element,
wherein, the first refresh rate is M times the second refresh rate, M is larger than 1, and the first refresh rate is P times the third refresh rate, P is larger than 1 and not equal to M.

7. A display device including:
the array substrate according to claim 1; and
a control module for switching refresh rate of the array substrate, and when the array substrate works under a first refresh rate, a cut-off voltage is output to the second switching element and the third switching element through the second switching controlling line and the third switching controlling line, respectively, to disconnect the second switching element and the third switching element; when the array substrate works under a second refresh rate, a turn-on voltage is output to the second switching element through the second switching controlling line to conduct the second switching element and a cut-off voltage is output to the third switching element through the third switching controlling line to disconnect the third switching element; when the array substrate works under a third refresh rate, a turn-on voltage is output to the second switching element and the third switching element through the second switching controlling line and the third switching controlling line, respectively, to conduct the second switching element and the third switching element, wherein, the first refresh rate is M times the second refresh rate, M is larger than 1, and the first refresh rate is P times the third refresh rate, P is larger than M.

8. A method for controlling refresh rate of an array substrate, the array substrate includes the array substrate according to claim 1, and the method includes:

when the array substrate works under a first refresh rate, outputting a cut-off voltage to the second switching element and the third switching element through the second switching controlling line and the third switching controlling line, respectively, to disconnect the second switching element and the third switching element;

when the array substrate works under a second refresh rate, outputting a turn-on voltage to the second switching element through the second switching controlling line to conduct the second switching element, and outputting a cut-off voltage to the third switching element through the third switching controlling line to disconnect the third switching element;

when the array substrate works under a third refresh rate, outputting a cut-off voltage to the second switching element through the second switching controlling line to disconnect the second switching element, and outputting a turn-on voltage to the third switching element through the third switching controlling line to conduct the third switching element, wherein, the first refresh rate is M times the second refresh rate, M is larger than 1, and the first refresh rate is P times the third refresh rate, P is larger than 1 and not equal to M.

9. A method for controlling refresh rate of an array substrate, the array substrate includes the array substrate according to claim 1, and the method includes:

when the array substrate works under a first refresh rate, outputting a cut-off voltage to the second switching element and the third switching element through the second switching controlling line and the third switching controlling line, respectively, to disconnect the second switching element and the third switching element;

when the array substrate works under a second refresh rate, outputting a turn-on voltage to the second switching element through the second switching controlling line to conduct the second switching element, and outputting a cut-off voltage to the third switching element through the third switching controlling line to disconnect the third switching element;

when the array substrate works under a third refresh rate, outputting a turn-on voltage to the second switching element and the third switching element through the second switching controlling line and the third switching controlling line, respectively, to conduct the second switching element and the third switching element, wherein, the first refresh rate is M times the second refresh rate, M is larger than 1, and the first refresh rate is P times the third refresh rate, P is larger than M.

* * * * *